United States Patent
Pmsvvsv et al.

(10) Patent No.: US 10,367,215 B2
(45) Date of Patent: Jul. 30, 2019

(54) FUEL CELL SYSTEM WITH VARIABLE AUXILIARY BUS VOLTAGE AND METHOD OF OPERATING THEREOF

(71) Applicant: BLOOM ENERGY CORPORATION, Sunnyvale, CA (US)

(72) Inventors: Prasad Pmsvvsv, Sunnyvale, CA (US); Arne Ballantine, Palo Alto, CA (US); Rakesh Roy, Bangalore (IN); Ranganathan Gurunathan, Bangalore (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 221 days.

(21) Appl. No.: 15/161,683

(22) Filed: May 23, 2016

(65) Prior Publication Data
US 2017/0338502 A1    Nov. 23, 2017

(51) Int. Cl.
| | |
|---|---|
| H01M 8/24 | (2016.01) |
| G06Q 10/00 | (2012.01) |
| H01M 8/0432 | (2016.01) |
| H01M 8/0438 | (2016.01) |
| H01M 8/04014 | (2016.01) |
| H01M 8/04858 | (2016.01) |

(52) U.S. Cl.
CPC ........ *H01M 8/04888* (2013.01); *G06Q 10/20* (2013.01); *H01M 8/04014* (2013.01); *H01M 8/04365* (2013.01); *H01M 8/04425* (2013.01); *H01M 8/24* (2013.01)

(58) Field of Classification Search
None
See application file for complete search history.

(56) References Cited

U.S. PATENT DOCUMENTS

| | | | |
|---|---|---|---|
| 4,046,956 | A | 9/1977 | Fanciullo |
| 5,102,040 | A * | 4/1992 | Harvey ............... F24F 11/0001 |
| | | | 165/289 |
| 5,257,180 | A | 10/1993 | Sashida et al. |
| 5,262,935 | A | 11/1993 | Shirahama et al. |
| 6,362,540 | B1 | 3/2002 | Hill |
| 6,757,590 | B2 | 6/2004 | Ross et al. |

(Continued)

FOREIGN PATENT DOCUMENTS

| | | |
|---|---|---|
| KR | 10-2009-0085973 | 8/2009 |
| WO | WO 2009-105191 A2 | 8/2009 |

OTHER PUBLICATIONS

International Search Report & Written Opinion, International Application No. PCT/US2011/060604, dated May 25, 2012.

(Continued)

*Primary Examiner* — Maria Laios
(74) *Attorney, Agent, or Firm* — The Marbury Law Group, PLLC

(57) ABSTRACT

A method of operating a fuel cell system which includes a plurality of fuel cells and a plurality of auxiliary components located in at least one cabinet, includes monitoring, by a control unit, a parameter of the fuel cell system, determining whether the parameter has violated a threshold, and varying an auxiliary bus voltage provided to the plurality of auxiliary components connected to a common auxiliary bus by a first amount in response to determining that the parameter has violated the threshold.

18 Claims, 6 Drawing Sheets

(56) References Cited

U.S. PATENT DOCUMENTS

| | | |
|---|---|---|
| 7,061,139 B2 | 6/2006 | Young et al. |
| 7,564,703 B1 | 7/2009 | Braun et al. |
| 7,599,760 B2 | 10/2009 | Dutta et al. |
| 7,705,490 B2 | 4/2010 | Srinivasan et al. |
| 7,713,649 B2 | 5/2010 | Hickey et al. |
| 8,148,023 B2 | 4/2012 | Schriever et al. |
| 8,197,978 B2 | 6/2012 | Ballantine et al. |
| 8,211,583 B2 | 7/2012 | Weingaertner et al. |
| 8,263,276 B1 | 9/2012 | Gurunathan et al. |
| 8,288,891 B2 | 10/2012 | Ballantine et al. |
| 8,563,180 B2 | 10/2013 | Perry et al. |
| 9,142,847 B2 | 9/2015 | Higdon |
| 2002/0027791 A1 | 3/2002 | Yoshioka et al. |
| 2002/0119354 A1* | 8/2002 | O'Brien ............... B60H 1/3233 429/423 |
| 2002/0192516 A1* | 12/2002 | Tajima ................. G06Q 10/06 700/286 |
| 2003/0031903 A1 | 2/2003 | Peschke et al. |
| 2003/0111842 A1 | 6/2003 | Gilbreth et al. |
| 2004/0028968 A1 | 2/2004 | Okamoto |
| 2004/0053082 A1 | 3/2004 | McCluskey et al. |
| 2004/0164702 A1 | 8/2004 | Holmes |
| 2008/0042615 A1 | 2/2008 | Serrels et al. |
| 2008/0053716 A1 | 3/2008 | Scheucher |
| 2008/0067869 A1 | 3/2008 | Evans et al. |
| 2008/0152962 A1 | 6/2008 | Poonamallee et al. |
| 2009/0030712 A1 | 1/2009 | Bogolea et al. |
| 2009/0115375 A1 | 5/2009 | Iida |
| 2009/0273240 A1 | 11/2009 | Gurunathan et al. |
| 2010/0009220 A1* | 1/2010 | Higdon ............ H01M 8/04365 429/431 |
| 2010/0009221 A1 | 1/2010 | Ballantine et al. |
| 2010/0013317 A1 | 1/2010 | Ballantine et al. |
| 2010/0188869 A1 | 7/2010 | Fredette et al. |
| 2010/0239924 A1 | 9/2010 | McElroy et al. |
| 2011/0008687 A1 | 1/2011 | Ballantine et al. |
| 2011/0011362 A1 | 1/2011 | Sridhar et al. |
| 2011/0258112 A1 | 10/2011 | Eder et al. |
| 2011/0281185 A1 | 11/2011 | Sridhar et al. |
| 2012/0091964 A1 | 4/2012 | Vance et al. |
| 2012/0098336 A1 | 4/2012 | Gurunathan et al. |
| 2012/0122004 A1* | 5/2012 | Jeon, II ............... H01M 8/0432 429/437 |
| 2012/0146587 A1 | 6/2012 | Srinivasan et al. |
| 2012/0270117 A9 | 10/2012 | Venkataraman et al. |
| 2012/0306292 A1* | 12/2012 | Imanishi ........... H01M 8/04947 307/151 |
| 2013/0020875 A1 | 1/2013 | Wozniak et al. |
| 2014/0106247 A1 | 4/2014 | Higdon et al. |
| 2016/0079613 A1 | 3/2016 | Gurunathan et al. |

OTHER PUBLICATIONS

International Search Report & Written Opinion, International Application No. PCT/US2011/057440, dated Apr. 27, 2012.

Choi et al., "Fuel Cell Powered Ups Systems: Design Considerations," Power Electronics Specialist Conference, 2003, IEEE 34th Annual (vol. 1).

International Search Report and written opinion received in connection with International Application No. PCT/US2013/065012; dated Jan. 22, 2014, 12 pages.

International Preliminary Report on Patentability received in connection with International Application No. PCT/US2013/065012; dated Apr. 30, 2015.

* cited by examiner

FUEL CELL SYSTEM WITH VARIABLE AUXILIARY BUS VOLTAGE AND METHOD OF OPERATING THEREOF

TECHNICAL FIELD

The present disclosure generally relates to fuel cell systems and, more particularly, to monitoring auxiliary components in fuel cell systems.

BACKGROUND

Fuel cell systems contain one or more power modules for generating power. Each power module and other modules in the fuel cell system may also contain a number of auxiliary components. These auxiliary components may include fans, electronic circuits, blowers, pumps, heaters, fuel control valves, and glow plugs. These auxiliary components may all be connected to the same auxiliary bus, which provides power to all the auxiliary components.

SUMMARY

An embodiment provides a method of operating a fuel cell system comprising a plurality of fuel cells and a plurality of auxiliary components located in at least one cabinet, comprising monitoring, by a control unit, a parameter of the fuel cell system, determining whether the parameter has violated a threshold, and varying an auxiliary bus voltage provided to the plurality of auxiliary components connected to a common auxiliary bus by a first amount in response to determining that the parameter has violated the threshold.

Another embodiment provides fuel cell system, comprising a plurality of auxiliary components connected to a common auxiliary voltage bus, an input/output module configured to provide an auxiliary bus voltage to the plurality of auxiliary components via the common auxiliary voltage bus, the common auxiliary bus configured to deliver the auxiliary bus voltage from the input/output module to the plurality of auxiliary components, and a control unit configured with processor-executable instructions to: monitor a parameter of the fuel cell system, determine whether the parameter has violated a threshold, and vary the auxiliary bus voltage provided to the plurality of auxiliary components by a first amount in response to determining that the parameter has violated the threshold.

BRIEF DESCRIPTION OF THE DRAWINGS

The accompanying drawings, which are incorporated herein and constitute part of this specification, illustrate examples of the disclosed devices and methods, and together with the general description given above and the detailed description given below, serve to explain the features of the invention.

DETAILED DESCRIPTION

Figure 1:
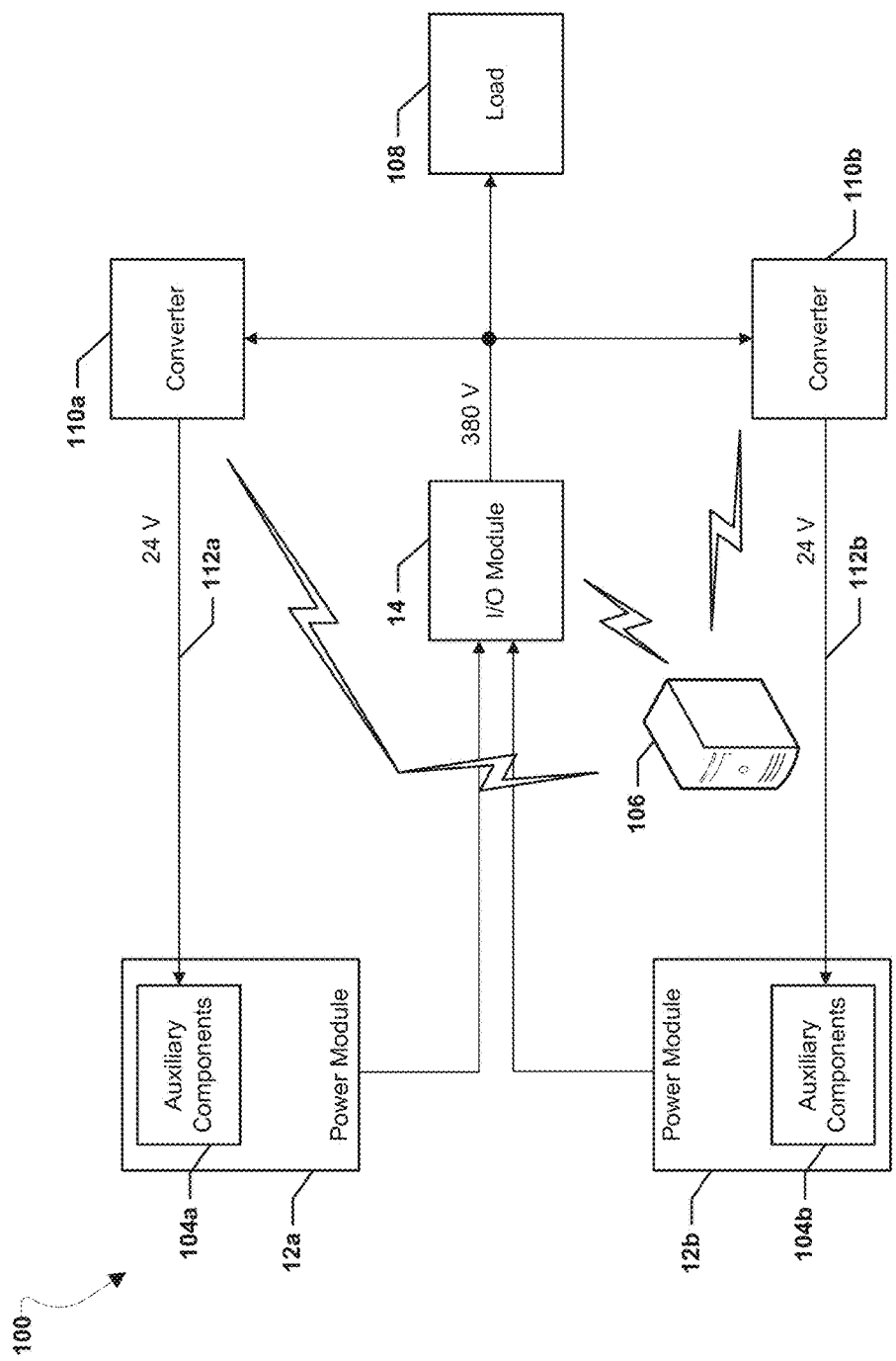
FIG. 1 is a schematic of a fuel cell system providing power to auxiliary components according to the present disclosure.

The various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. It is also understood that the examples shown in the figures are not mutually exclusive. Features shown in one example (e.g., in one figure) may be included in other examples (e.g., in other figures).

Auxiliary Components in Fuel Cell Systems

Fuel cell systems may include a number of power modules for generating power, and one or more input/output modules for collecting the generated power and converting the power (e.g. using a DC to AC inverter) so that the power may be provided to a load. Each of the power modules and the input/output modules, as well as any other modules in the fuel cell system, include a number of auxiliary components that aid in the operation of the module. The auxiliary components may include, but are not limited to, fans, electronic circuits, glow plugs (e.g. hot box glow plugs for heating a hot box), blowers (e.g. CPOx reactor inlet air blowers), heaters, pumps, and valves (e.g. fuel control valves, water control valves, safety isolation valves, etc.). Each module may house its own auxiliary components, which are connected to a power source via a common auxiliary bus. The auxiliary bus voltage may be provided by the input/output module, which diverts some of the generated power from the power modules to the auxiliary components of the fuel cell system.

During operation of the fuel cell system, each power module or input/output module generates a large amount of heat. This heat should be dissipated in order to protect the various components, including the auxiliary components, from overheating and breaking down. Fans, which may be one of the auxiliary components, may be used to blow air within the module to cool the components. The fuel cell system may also include one or more filters that filters out unwanted particles from the cooling air coming into the system, as described in U.S. patent application Ser. No. 13/242,194, entitled "Fuel Cell Mechanical Components," filed Sep. 23, 2011, which is hereby incorporated by reference in its entirety. Temperature sensors within each module may be used to measure the temperature within each module. When the measured temperature of the auxiliary components increases, it may indicate that there is a problem with the cooling system. For example, if the filters become clogged with particles, the air flow to the fans is reduced, thus reducing the effectiveness of the fans. This may raise the temperature within the modules, and may lead to the overheating of auxiliary components. When this occurs, an alarm is usually activated that signals maintenance personnel to correct the problem. However, maintenance personnel may not be able to immediately attend to the problem. In the interim higher temperatures persist which may lead to damage of the auxiliary components.

Various implementations disclosed herein provide a way to monitor and counteract changing temperatures or other parameters the fuel cell system containing auxiliary components by varying the auxiliary bus voltage. A control unit communicates with and controls aspects of the fuel cell system. The control unit may monitor a parameter associated with one or more auxiliary components in the fuel cell system. For example, the control unit may monitor the temperature in a power module and/or input/output module housing a number of auxiliary components, or may monitor the temperature of one or more auxiliary components directly, such as an inverter temperature. The parameters that may be monitored are not limited to temperature, but may also include air pressure (e.g. measured by air pressure sensors to detect when a clogged filter is reducing air pressure) or liquid pressure (liquid pressure sensors for pumps or valves carrying liquids) among other things. The control unit may determine whether the parameter has violated a threshold, for example a temperature threshold. If the control unit determines that the parameter has violated the threshold, the control unit may instruct a converter (e.g., an AC/AC converter located in a power module and/or the input/output module) to vary the auxiliary bus voltage going to the auxiliary components by a certain amount. This may increase or decrease the voltage going to all the auxiliary components connected to the auxiliary bus. For example, increasing the voltage to a fan may increase the fan power for cooling. The fan thus provides more cooling to the auxiliary components and decreases the temperature parameter of the electronic circuit.

The control unit may then determine whether the parameter still violates the threshold after the varying the auxiliary bus voltage. For example, the control unit may monitor the temperature of the inside of the power module while the fan power is increased and determines whether the temperature drops below the threshold. If the parameter does not violate the threshold anymore, the control unit may schedule a maintenance visit for personnel to correct the problem causing the increased temperature. If the parameter still violates the threshold, the control unit may continue varying the auxiliary bus voltage, either by increasing it or decreasing it, until it reaches a voltage limit (e.g. an upper voltage limit preventing overloading of one or more auxiliary components connected to the auxiliary bus). If the parameter still violates the threshold when the auxiliary bus voltage is at the voltage limit, an alarm may be initiated to prompt immediate action by maintenance personnel.

In this manner, the control unit may vary the auxiliary bus voltage to counteract changes in parameters affecting one or more auxiliary components in the fuel cell system. This prevents damage from occurring to the fuel cell system in the interim before maintenance personnel have a chance to fix the problem. The auxiliary components are all connected to the same auxiliary bus and thus all experience the variation in auxiliary bus voltage. However, the net effect of varying the voltage to all auxiliary components changes the parameter being monitored. For example, increasing the voltage to a fan may decrease the temperature of the auxiliary components, or increasing the voltage to a valve may increase the solenoid current such that the valve cycles properly and the pressure through the valve increases. This is particularly useful for auxiliary components, which are usually not individually adjustable components that have a dedicated power bus. While some sensitive or expensive equipment in the fuel cell system may be individually monitored and adjusted, auxiliary components such as fans, valves, blowers and pumps typically do not have such features as controllable sensors, dials, or multiple states of operation. Instead, such basic auxiliary components may have only two states of operation, on and off. However, varying the input voltage to such auxiliary components may still result in varying the output of the auxiliary component (e.g., increasing voltage to spin a fan faster or open a valve with more force). Thus varying the auxiliary bus voltage applied to a number of auxiliary components is an indirect way to adjust the operation of one particular auxiliary component. In some implementations, the auxiliary bus voltage is decreased in response to determining that a parameter violates a threshold. For example, if the temperature of the module housing the auxiliary components is cooler than normal, the auxiliary bus voltage may be reduced to reduce the fan power. There is less cooling for the auxiliary components and as a result the temperature increases.

FIG. 1 illustrates a schematic diagram of a fuel cell system 100 according to the present disclosure. The fuel cell system 100 includes power, or fuel cell, modules 12a and 12b, and may include any number of additional power modules. Each of the power modules 12a and 12b and any other power modules in the fuel cell system 100 generate power that is used to power various loads, such as load 108. The power modules 12a and 12b include one or more auxiliary components 104a and 104b respectively. The auxiliary components 104a and 104b may include, but are not limited to, fans, electronic circuits, glow plugs (e.g. catalytic reactor glow plugs), blowers (e.g. CPOx reactor blowers), heaters, pumps, and valves (e.g. fuel control valves). A more detailed description of a power module is found with reference to FIG. 5, and a more detailed description of a fuel cell system is found with reference to FIG. 6.

Figure 2:
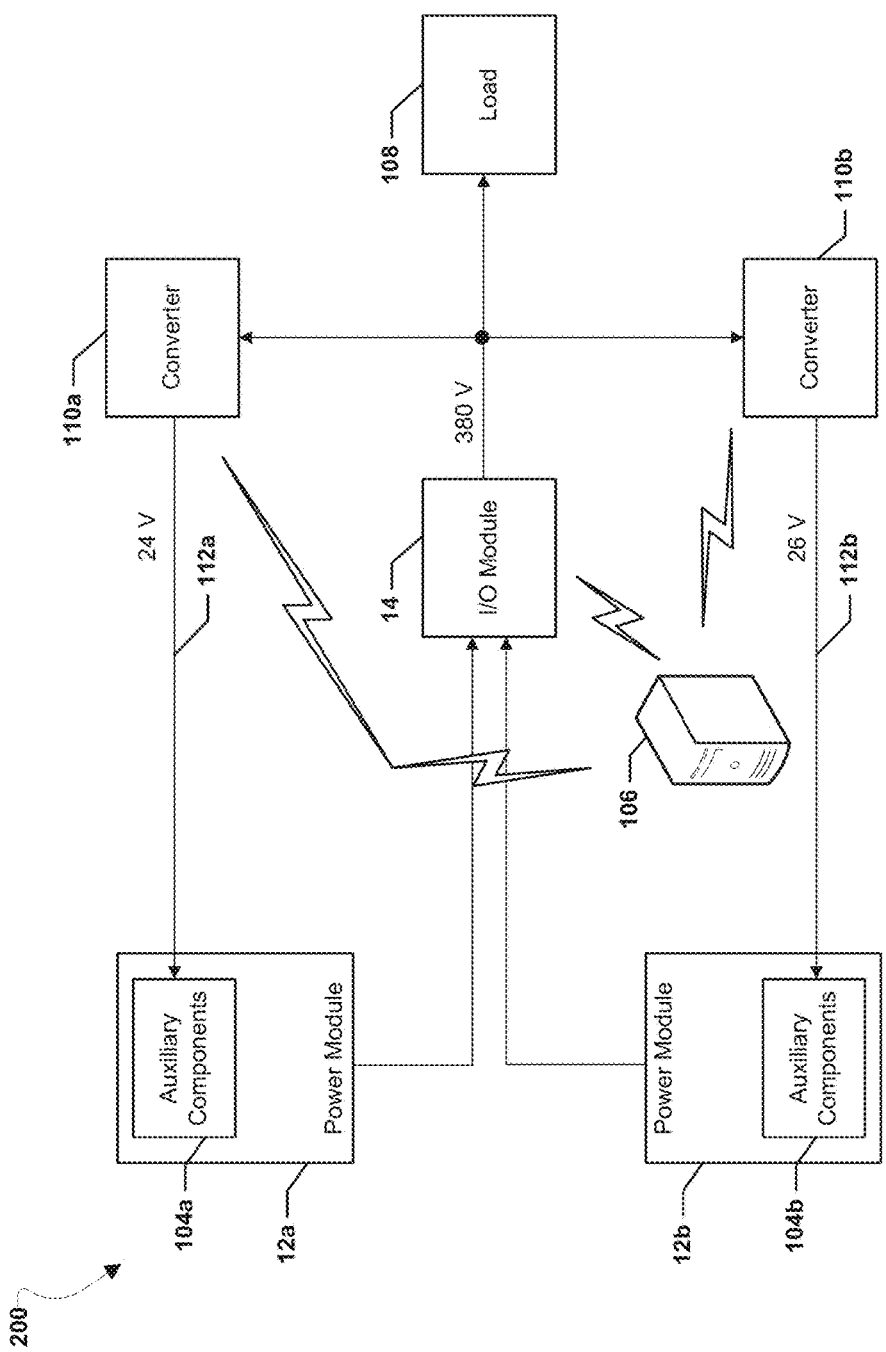
FIG. 2 is another schematic of a fuel cell system providing power to auxiliary components according to the present disclosure.
Figure 3:
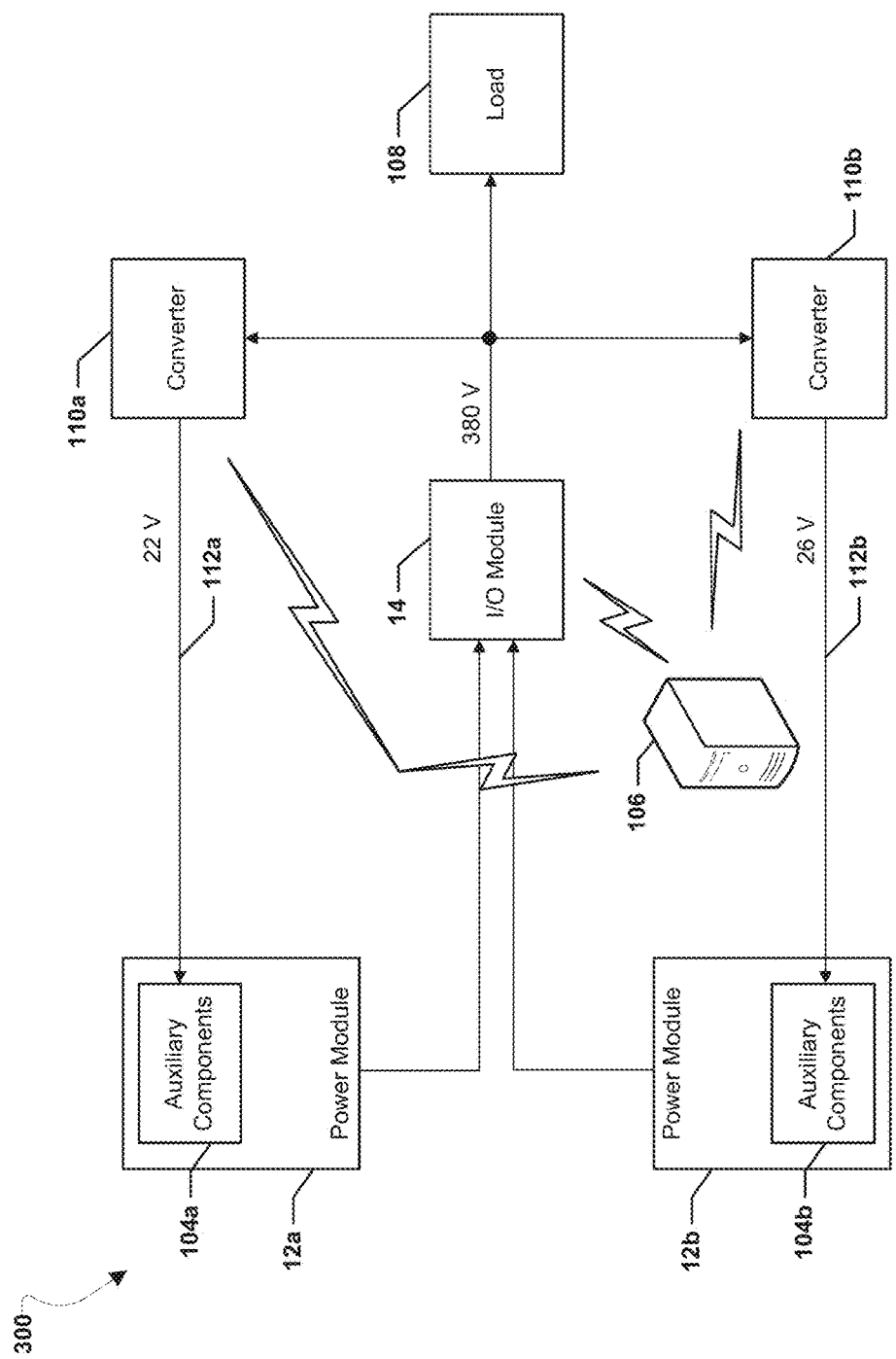
FIG. 3 is another schematic of a fuel cell system providing power to auxiliary components according to the present disclosure.

The fuel cell system 100 also includes an input/output module 14, which collects the power generated by the power modules 12a and 12b. The input/output module 14 aggregates the power from each power module and may convert the power before outputting it. For example, the input/output module 14 may include one or more DC/AC converters (i.e., inverters) that convert the DC power generated by the power modules 12a and 12b into AC power. As illustrated in FIG. 1, the input/output module 14 outputs 380V in AC current which may be used to provide power to a load 108. The voltages illustrated in FIGS. 1-3 are merely illustrative, and a range of other voltages may be present in the fuel cell system 100. Although not illustrated in FIG. 1, the input/output module 14 may also include one or more auxiliary components.

The fuel cell system 100 may also include converters 110a and 110b that are connected, in parallel, to the output of the input/output module 14. The converters 110a and 110b may be step down, or buck, converters that reduce the voltage output from the input/output module 14. For example, as illustrated in FIG. 1, the converters 110a and 110b may be AC/AC converters that reduce the 380V output of the input/output module 14 to a 24V AC power output. The converters 110a and 110b are connected to the auxiliary components 104a and 104b through auxiliary buses 112a and 112b respectively. Thus an auxiliary bus voltage of 24V is provided to the auxiliary components 104a and 104b. Thus the input/output module 14 diverts some power generated by the power modules 12a and 12b to power the auxiliary components 104a and 104b through the converters 110a, 110b and the auxiliary buses 112a, 112b. The converters 110a, 110b may be located within the power modules 12a, 12b, or may be located within the input/output module 14, or may be located elsewhere in the fuel cell system 100. The control unit 106 may vary the auxiliary bus voltage provided to the auxiliary components by instructing the input/output module 14 to vary the voltage fed to the converters 110a, 110b and/or by controlling the converters 110a, 110b to increase or decrease their output voltage.

The input/output module 14 may also communicate with the converters 110a, 110b and/or a control unit 106, either through a wired or wireless connection. The control unit 106 may also be in direct communication with one or more of the power modules 12a and 12b, or may communicate with the power modules 12a, 12b through the input/output module 14. The control unit 106 may be a remote server located away from the power modules 12a, 12b and the input/output module 14. Alternatively, some components of the control unit 106 may be located in the input/output module 14 while other components of the control unit 106 are located at a remote server. The control unit 106 may include memory for storing data and processor-executable instructions. The control unit 106 may also include a processor for executing the processor-executable instructions that, when performed, allow the control unit 106 to monitor and control aspects of the operation of the fuel cell system 100, such as controlling the auxiliary bus voltage provided to the auxiliary components 104a and 104b and scheduling maintenance for the fuel cell system 100.

The control unit 106 may monitor various parameters within the power modules 12a, 12b, and the input/output module 14. For example, module cabinet(s) may have temperature sensors in the cabinets, and/or chips within inverters in the input/output module 14 may include a temperature sensor that measures the temperature within the modules. One or more modules may also include an air flow detector for detecting the amount of air flow inside the module, a pressure differential sensor for measuring the pressure differential on either side of the filters, a pressure filter on pipes, valves or pumps that measure the pressure of the gas or liquid within those components, or other sensors that measure the operation of various auxiliary components. The control unit 106 may receive the output of all the various sensors to monitor operational parameters of the auxiliary components 104a, 104b, such as temperature, air flow, air pressure, fluid pressure, or other such parameters. The control unit 106 may also store operational thresholds for the parameters which define preferred operational boundaries for each of the parameters, for example an upper and lower temperature threshold. The control unit 106 may monitor whether a parameter violates a threshold.

For example, the auxiliary components 104a, 104b contained in the power modules 12a, 12b may generate or be exposed to a substantial amount of heat during operation of the fuel cell system 100. The auxiliary components 104a, 104b may include at least one fan that blows cooling air inside the power modules 12a, 12b to cool the auxiliary components 104a, 104b and other components within the modules. The fuel cell system 100 may include one or more filters that filter the air used by the fans to cool the fuel cell system 100. These filters may clog up with various particles over time, reducing the air pressure intake of the fuel cell system 100 and thus reducing the effectiveness of the fans. As the effectiveness of the fans decreases, the temperature that the auxiliary components 104a and 104b are exposed to may increase. This may impact the performance of certain auxiliary components, such as electronic circuits that may be sensitive to overheating.

The control unit 106 may detect changes in temperature within the power modules 12a, 12b and the input/output module 14 through temperature sensors within those modules. The control unit 106 may store an upper and lower temperature threshold. For example, the control unit 106 may detect that the temperature of the auxiliary components 104b in the power module 12b has violated a threshold (e.g. the upper temperature threshold). Upon determining that the temperature of the auxiliary components 104b has violated a threshold, the control unit 106 may take actions to counteract the increase in temperature, as described with reference to FIG. 2.

FIG. 2 illustrates a schematic diagram of a fuel cell system 200 according to the present disclosure. The fuel cell system 200 is similar to the fuel cell system 100 in FIG. 1. That is, the fuel cell system 200 includes power modules 12a, 12b, with auxiliary components 104, 104b, connected to input/output module 14. The input/output module 14 is connected to a load 108 and converters 110a, 110b, which provide power to the auxiliary components 104a, 104b through auxiliary buses 112a, 112b. The control unit 106 monitors and controls one or more aspects of the operation of the fuel cell system 200.

In one example, the control unit 106 has detected that the temperature of the auxiliary components 104b has violated a threshold (e.g. an upper temperature threshold). In response, the control unit 106 may instruct the converter 110b to vary (e.g., to increase) its output voltage and/or instruct the input/output module 14 to vary the voltage provided to the converter 110b, and specifically to increase the voltage. This in turn increases the output voltage of the converter 110b. For example, in FIG. 2 the output voltage of the converter 110b has been increased to 26V, while the output voltage of the converter 110a remains at 24V. Thus the auxiliary bus 112b provides an auxiliary bus voltage of 26V to auxiliary components 104b. The increased auxiliary bus voltage causes all of the auxiliary components 104b to increase their operational output. This may include increasing the fan power, which in turn increases the cooling provided by the fan to the auxiliary components 104b. Thus varying the auxiliary bus voltage may lead to the parameter not violating the threshold anymore, e.g. decreasing the temperature of the auxiliary components 104b below the upper temperature threshold.

The control unit 106 may use a number of different methods to vary the auxiliary bus voltage that is powering the auxiliary components 104b. For example, the control unit 106 may use a step function to vary the auxiliary bus voltage by discrete amounts once the monitored parameter violates the threshold. Alternatively, the control unit 106 may use a proportional function that varies the auxiliary bus voltage in proportion to how much the monitored parameter exceeds the threshold. Alternatively, the control unit 106 may use a PID controller, or other more complicated feedback control systems, to determine how to vary the auxiliary bus voltage in response to the monitored parameter violating the threshold. Such feedback control systems are generally known in the art. Regardless of the methodology used to determine how to vary the auxiliary bus voltage, the control unit 106 varies the auxiliary bus voltage by certain amounts to counteract the change in the monitored parameter.

The control unit 106 may continue to monitor the parameter to determine whether the parameter still violates the threshold after varying the auxiliary bus voltage. For example, the control unit 106 may monitor the temperature of the auxiliary components 104b for a period of time to determine whether the increased fan power has cooled the auxiliary components 104b below the upper temperature threshold. If the control unit 106 detects that the parameter does not violate the threshold anymore, the control unit 106 may schedule a maintenance visit by maintenance personnel responsible for fixing the fuel cell system 200. For example, a maintenance schedule may be stored as a database, spreadsheet, or some other data form in the control unit 106. The control unit 106 may update the maintenance schedule to schedule a maintenance visit for power module 12b at an appropriate time, and may display the updated maintenance schedule to maintenance personnel (e.g. using a display screen). Thus the control unit 106 is able to counteract a change in a monitored parameter during the time between detection of the problem and when maintenance personnel are available to fix the problem. After maintenance personnel fix the problem (e.g. replacing the filter), the maintenance personnel may manually reset the auxiliary bus voltage to its normal value or the control unit 106 may detect that the problem has been fixed and reset the auxiliary bus voltage to its normal value.

If the control unit 106 determines that the monitored still violates the threshold after varying the auxiliary bus voltage, the control unit 106 may further vary the auxiliary bus voltage until the monitored parameter does not violate the threshold anymore. However, the control unit 106 may be limited in how much to vary the auxiliary bus voltage by a voltage limit. This voltage limit may be determined by one or more voltage rating limits of the auxiliary components. For example, increasing the auxiliary bus voltage past an upper voltage limit may cause serious damage to one or more auxiliary components. Also, decreasing the auxiliary bus voltage below a lower voltage limit may result in one or more of the auxiliary components not functioning properly because of a lack of sufficient power. If the auxiliary bus voltage reaches a voltage limit and the monitored parameter still violates the threshold, the control unit 106 may initiate an alarm to indicate to maintenance personnel that immediate action is required. For example, if the upper voltage limit of the auxiliary components 104b is 27V, the control unit 106 may increase the auxiliary bus voltage on auxiliary bus 112b to 27V. If the temperature of the auxiliary components 104b still violates the upper temperature threshold when the voltage provided to the fan (and other auxiliary components) is 27V, the control unit 106 may activate an alarm indicating immediate maintenance of power module 12b is needed.

In this manner, the control unit 106 may monitor and counteract changes to monitored parameters in the power modules 12a, 12b and any other power modules in the fuel cell system 200, as well in the input/output module 14, by varying the auxiliary bus voltage to auxiliary components in these modules. In some implementations, the control unit 106 may vary the auxiliary bus voltage to multiple modules at the same time. For example, the control unit 106 may increase the auxiliary bus voltage to both auxiliary components 104a and 104b at the same time and by the same amount. In some implementations, the auxiliary bus voltage provided to each module may be individualized according to the operational parameters being monitored in each module. This is described with reference to FIG. 3.

FIG. 3 illustrates a schematic diagram of a fuel cell system 300 according to the present disclosure. The fuel cell system 300 is similar to the fuel cell systems 100, 200 in FIGS. 1 and 2. That is, the fuel cell system 300 includes power modules 12a, 12b, with auxiliary components 104, 104b, connected to input/output module 14. The input/output module 14 is connected to a load 108 and converters 110a, 110b, which provide power to the auxiliary components 104a, 104b through auxiliary buses 112a, 112b. The control unit 106 monitors and controls one or more aspects of the operation of the fuel cell system 300.

In an example, the control unit 106 may monitor the temperature of the auxiliary components 104a and 104b. The control unit 106 may detect that the temperature of the auxiliary components 104b has violated an upper temperature threshold, but at the same time may detect that the temperature of the auxiliary components 104a has violated a lower temperature threshold. For example, this may be caused by a clogged filter in the power module 12A and/or cold weather conditions where the fuel cell system 300 is located. In response, the control unit 106 may decrease the voltage provided to the converter 110a while at the same time increasing the voltage provides to the converter 110b either by instructing converter 100b and/or by instructing the input/output module 14. This results in a decrease of the output voltage of the converter 110a and an increase in the output voltage of the converter 110b. For example, in FIG. 3 the output voltage of the converter 110b has been increased to 26V, while the output voltage of the converter 110a is decreased to 22V. Thus the auxiliary bus 112a provides an auxiliary bus voltage of 22V to auxiliary components 104a. The decreased auxiliary bus voltage causes all of the auxiliary components 104a to decrease their operational output. This may include decreasing the fan power, which in turn decreases the cooling provided by the fan to the auxiliary components 104a. Thus decreasing the auxiliary bus voltage may lead to an increase in the monitored parameter that has violated a threshold, e.g. increasing the temperature of the auxiliary components 104a above the lower temperature threshold. The control unit 106 may continue decreasing the auxiliary bus voltage provided to the auxiliary components 104a until the parameter does not violate the threshold anymore, or until a lower voltage limit is reached. The control unit 106 may initiate an alarm at this point, or may continue to maintain the auxiliary bus voltage at the lower voltage limit.

The control unit 106 may continue to monitor the temperature parameters of the cabinets containing auxiliary components 104a and 104b separately, and vary the auxiliary bus voltage accordingly if the temperature parameters violate either the upper temperature threshold or the lower temperature threshold. The amount by which the control unit 106 may vary the auxiliary bus voltage may be limited by upper and lower voltage limits, which may differ for each auxiliary bus 112a and 112b. In this manner, the control unit 106 may separately monitor and vary the auxiliary bus voltage for multiple groups of auxiliary components, e.g. auxiliary components found in different power modules or input/output modules.

Methods of Varying Auxiliary Bus Voltage

Figure 4:
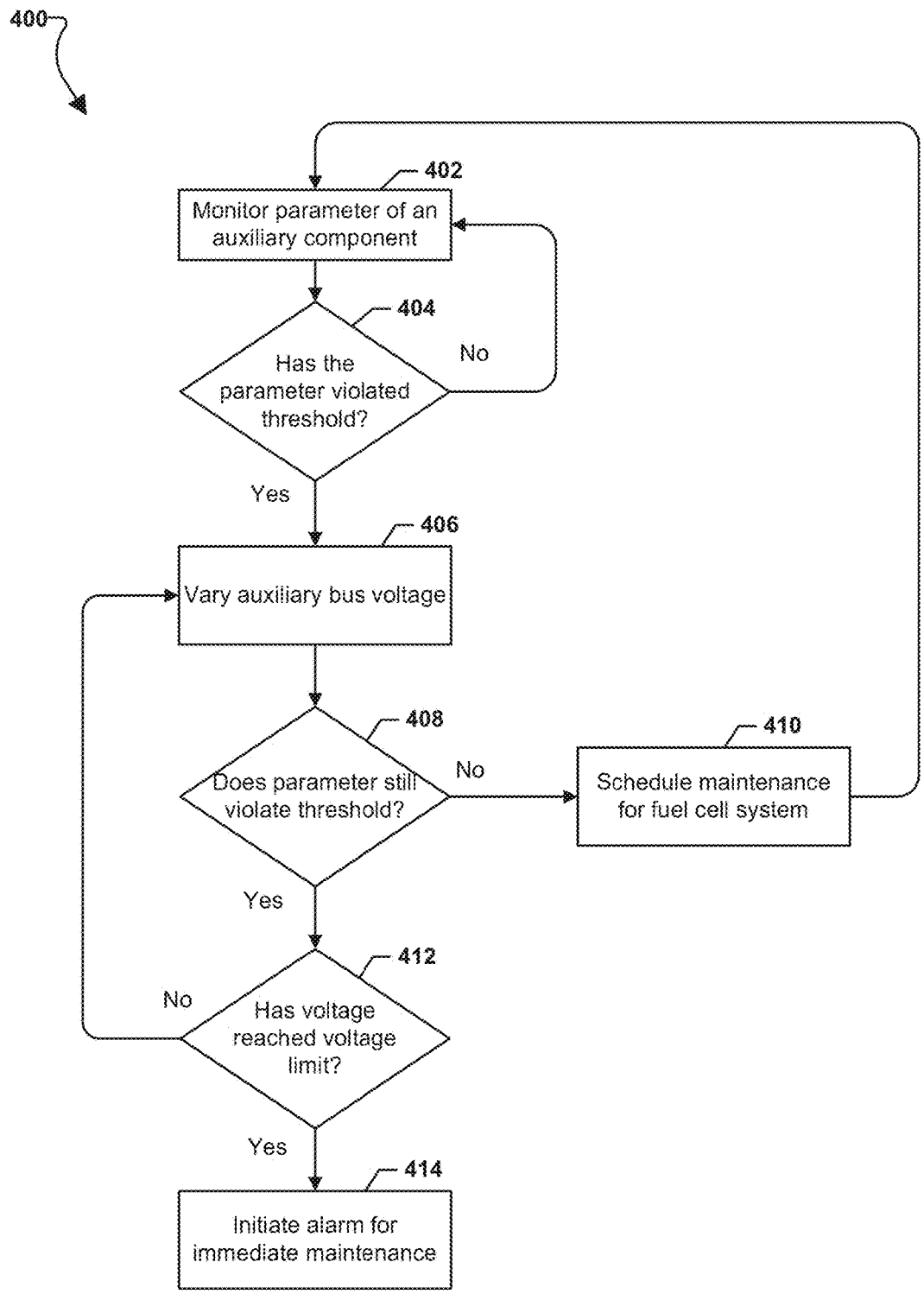
FIG. 4 is a flowchart illustrating a method for varying the auxiliary bus voltage for a fuel cell system according to the present disclosure.

FIG. 4 shows a flowchart illustrating an example of a method 400 of varying the auxiliary bus voltage in a fuel cell system. The method 400 may be performed by a control unit that monitors and controls one or more operational aspects of a fuel cell system. For example, the method 400 may be performed by the control unit 106 in the fuel cell system illustrated in FIGS. 1-3.

In block 402, the control unit may monitor a parameter a fuel cell system which includes a plurality of fuel cells and a plurality of auxiliary components in at least one cabinet. The auxiliary components may be one of a number of auxiliary components within a power module, input/output module, or another module (e.g. fuel processing module containing a desulfurizer) in the fuel cell system. The auxiliary component may be, among other things, a fan, an electronic circuit, a glow plug, a blower, a thawing heater, a pump, or a valve. The parameter being monitored may be, among other things, temperature, air pressure, liquid pressure, or pressure differential of the auxiliary component (e.g., fan or valve) connected to the common voltage bus or of another component (e.g., cabinet or conduit) of the fuel cell system. The control unit may receive the output of one or more sensors in the fuel cell system that measures the parameter being monitored. For example, the control unit may receive the output of a temperature sensor in a power module indicating the temperature experienced by the auxiliary components in the power module cabinet. In another example, the control unit may receive the output of a fluid pressure sensor in a conduit (e.g., the fuel inlet conduit) or in a valve (e.g., the fuel control valve) that the fluid (e.g., fuel or water) indicating the pressure or pressure difference in the conduit or valve. The control unit may monitor multiple parameters for multiple auxiliary components in the fuel cell system.

In determination block 404, the control unit may determine whether the parameter has violated a threshold. This threshold may be a predetermined upper or lower threshold defined in the control unit and may represent preferred operational boundaries for the monitored parameter. For example, the control unit may compare the temperature of a fuel cell system component (e.g., cabinet temperature) with an upper temperature threshold or lower temperature threshold, or it may compare a fluid pressure or pressure difference with a pressure or pressure difference threshold. In response to determining that the parameter does not violate the threshold (i.e. determination block 404="No"), the control unit may continue monitoring the parameter and any other parameters in the fuel cell system.

In response to determining that the parameter has violated the threshold (i.e. determination block 404="Yes"), the control unit may vary the auxiliary bus voltage by a certain amount in block 406. For example, the control unit may instruct the converter and/or the input/output module to increase or decrease the voltage flowing through the auxiliary bus. The control unit may also control other components in the fuel cell system to achieve the variation in auxiliary bus voltage. The control unit may use various feedback control systems or algorithms to determine the amount by which to vary the auxiliary bus voltage, such as a PID controller. The variation in auxiliary bus voltage results in the variation of operational output of all auxiliary components connected to the auxiliary bus. This may result in changing the monitored parameter so that it does not violate the threshold anymore. For example, an increase in the auxiliary bus voltage may increase the cooling power of a fan connected to the auxiliary bus, which in turn may cause a reduction in the monitored temperature of the fuel cell system component (e.g., cabinet and other power generation and/or auxiliary components located in the cabinet) below an upper temperature threshold. In another example, an increase in the auxiliary bus voltage may increase the solenoid current of a valve, which may cause the valve which is stuck or frozen to cycle properly at a higher probability and thus increases the throughput of the valve above a lower throughput threshold. Thus varying the auxiliary bus voltage causes a variation in the operation of all auxiliary components connected to the auxiliary bus, which may then cause a variation in the monitored parameter.

In determination block 408, the control unit may determine whether the parameter still violates the threshold. That is, the control unit may determine whether, after varying the auxiliary bus voltage, the monitored parameter has changed such that it does not violate the parameter anymore. In response to determining that the parameter does not violate the threshold anymore (i.e. determination block 408="No"), the control unit may then schedule maintenance service for the fuel cell system in block 410. This may include scheduling maintenance for the module in which the auxiliary component resides. For example, the control unit may store a maintenance schedule database and updates the database to schedule maintenance for a power module that houses the auxiliary component. This maintenance schedule may then be displayed to maintenance personnel.

In response to determining that the parameter still violates the threshold (i.e. determination block 408="Yes"), the control unit may then determine whether the auxiliary bus voltage has reached a voltage limit in determination block 412. The voltage limit may be an upper voltage limit or a lower voltage limit. In response to determining that the auxiliary bus voltage has not reached a voltage limit (i.e. determination block 412="No"), the control unit may further vary the auxiliary bus voltage in block 406 and determine whether the further variation causes the parameter to not violate the threshold. For example, the control unit may have already increased or decreased the auxiliary bus voltage by 1V, and if a voltage limit has not been reached yet the control unit may further increase or decrease the auxiliary bus voltage by another 1V.

In response to determining that the auxiliary bus voltage has reached a voltage limit (i.e. determination block 412="Yes"), the control unit may initiate an alarm for immediate maintenance in block 414. That is, the control unit was unable to bring the parameter within the threshold by varying the auxiliary bus voltage within the voltage limits, and immediate maintenance is needed to solve the problem. The alarm may include a screen alert, a sound, an email or text message, or any other method of alerting maintenance personnel. In some implementations, the control unit may maintain the auxiliary bus voltage at the voltage limit while initiating the alarm. In alternative implementations (not illustrated in FIG. 4), the control unit may maintain the auxiliary bus voltage at the voltage limit and not sound an alarm. This may be because although the parameter violates the threshold, no harm may result to the auxiliary component. For example, having a temperature lower than the lower temperature threshold may not impair operation of the auxiliary component. In this manner, method 400 provides a way to monitor and change parameters of an auxiliary component by varying the auxiliary bus voltage.

Power Module Cabinet

Figure 5:
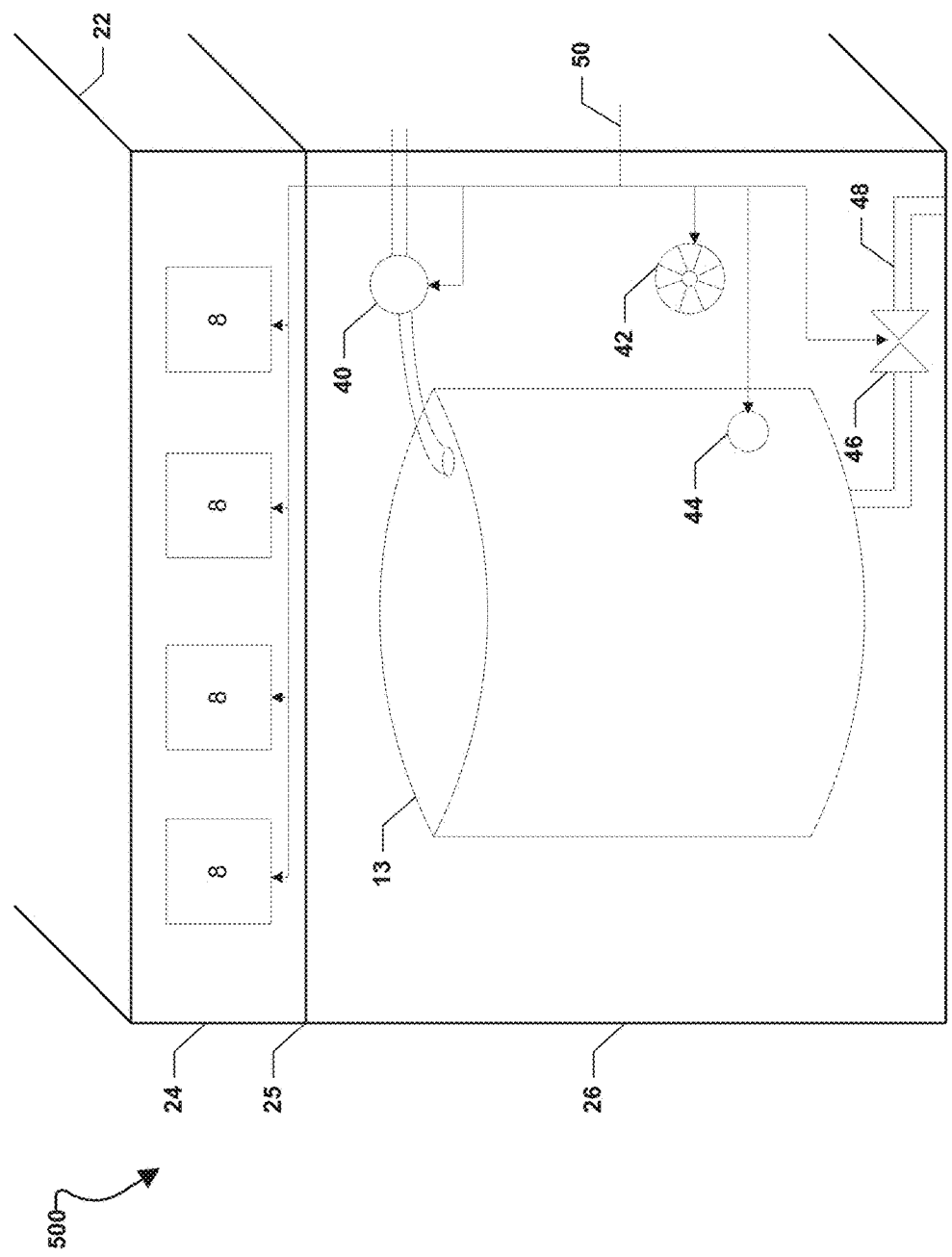
FIG. 5 depicts a cut-away view of a power module cabinet including various electronics and components according to the present disclosure.

FIG. 5 shows an example of a power, or fuel cell, module 500 for use in a fuel cell system as described in U.S. patent application Ser. No. 14/850,044, entitled "Air Cooled Fuel Cell System," filed Sep. 10, 2015, which is hereby incorporated by reference in its entirety. Power module 500 may be similar to the power modules 12*a* and 12*b* in FIGS. 1-3. The power module 500 may include a power, or fuel cell, module cabinet 22. The power module cabinet 22 provides separate air spaces for an electrical cabinet 24 (second compartment) and a fuel cell cabinet 26 (first compartment). The fuel cell cabinet 26 and the electrical cabinet 24 may be provided in a common frame or housing of the power module cabinet 22. This design reduces the size of the power system module 500, allowing the power module 500 to fit into small spaces for indoor applications, such as freight elevators and freight corridors. The power module cabinet 22 may include at least one wall or platform 25 separating the power module cabinet 22 into the fuel cell cabinet 26 and the electrical cabinet 24. FIG. 5 shows the electrical cabinet 24 stacked on top of the fuel cell cabinet 26. It is understood that in some examples, the electrical cabinet 24 may be provided below the fuel cell cabinet 26. In some examples, the fuel cell cabinet 26 and the electrical cabinet 24 may be arranged side by side.

The electrical cabinet 24 may be configured to contain one or more fans 8, which may be located on various electronic components, such as power converters (e.g., DC/DC converters). The fuel cell cabinet 26 may be configured to contain one or more power generation components. The one or more power generation components may include a hot box 13 containing one or more fuel cell stacks and a balance of plant (BOP) sub-system. A CPOx reactor blower 40 may be connected to the hot box 13 for providing an air inlet stream to the CPOx reactor. The hot box 13 may also have a glow plug 44 for heating the hot box 13. The hot box 13 may also be connected to a fuel valve 46 which controls the flow of fuel from a fuel inlet conduit (e.g., pipe) 48 to the fuel cell stacks in the hot box 13. The fuel cell cabinet 26 may include one or more cabinet fans 42 for cooling the interior of the fuel cell cabinet 26. The fans 8, CPOx reactor blower 40, cabinet fan 42, glow plug 44, fuel valve 46, and other components not illustrated in FIG. 5 are examples of auxiliary components that may be powered by a common auxiliary bus 50. By varying the auxiliary voltage on the common auxiliary bus 50, a control unit may be able to vary a parameter on one or more of the auxiliary components (e.g., increasing the voltage to make the fans 8, 42 spin faster, or force the fuel valve 46 to open with more force). Although varying the auxiliary voltage may affect all auxiliary components connected to the common auxiliary bus 50, it may result in a desired change in a target parameter of a target auxiliary component.

Fuel Cell System

Figure 6:
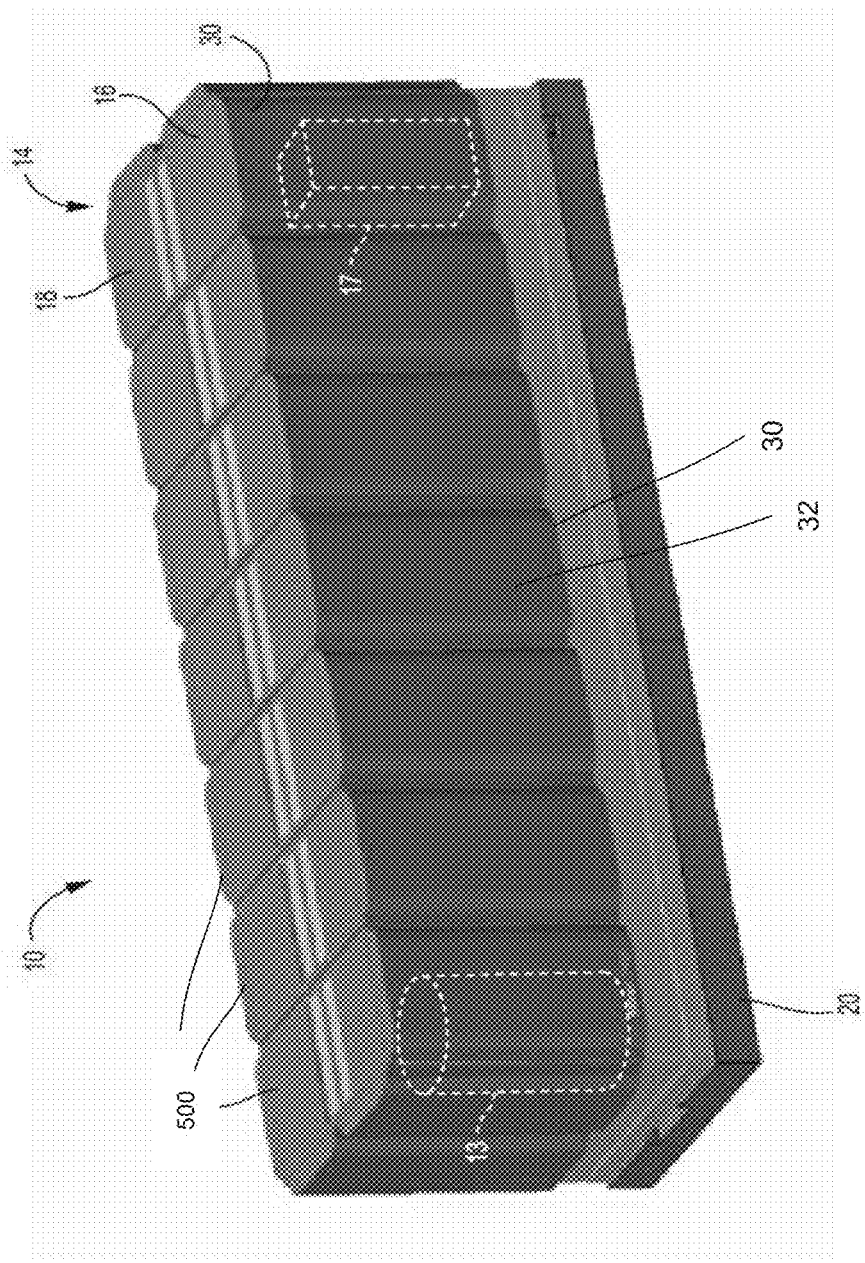
FIG. 6 is an isometric view of a fuel cell system according to the present disclosure.

FIG. 6 shows a fuel cell system 10 according to the present disclosure. The fuel cell system 10 may contain fuel cell, or power, modules and components described in U.S. patent application Ser. No. 11/656,006, filed on Jan. 22, 2007, and U.S. Pat. No. 8,440,362 B2, issued on Sep. 23, 2011, the contents of which are expressly incorporated herein by reference in their entireties. The fuel cell system 10 may be modular, i.e., it may include one or more power modules 500 and other modules. The modular fuel cell system 10 may allow for flexible system installations and operations. The modular fuel cell system 10 allows for flexible scaling of installed power-generating capacity. The modular fuel cell system 10 also increases reliability in power generation, and increases the flexibility of fuel processing and the flexibility of power output voltages and frequencies with a single design set. The modular design results in an "always on" unit with high availability and reliability. For example, when one power module 500 is taken off line (e.g., for maintenance, repair, or replacement), the other power modules 500 may not be affected, and may continue to operate. The modular design also provides an easy means of scaling to meet specific requirements of customers' installations. For example, when power demand increases, the modular design makes it easy to increase the number of power modules 500 to generate more power. The modular design also allows the use of available fuels and required voltages and frequencies, which may vary by customer and/or by geographic region.

The fuel cell system 10 may include one or more power modules 500 described above with respect to FIG. 5. The fuel cell system 10 may also include one or more fuel processing (or fuel input) modules 16. The fuel cell system 10 may include one or more power conditioning (e.g., electrical output) modules 18. The power modules 500 may be electrically and/or fluidly connected with at least one of the fuel processing module 16 or the power conditioning module 18 through wires, cables, and/or conduits provided within the fuel cell system 10, e.g., in the base 20. For example, the power modules 500 may be electrically connected with the power conditioning module 18 and/or the fuel processing module 16 through wires provided in the base 20. The power modules 500 may be fluidly connected with the fuel processing module 16 through fluid conduits (e.g., pipes) provided in the base 20, and may receive fuel, such as de-sulfurized fuel, from the fuel processing module 16.

The power conditioning module 18 may be configured to deliver direct current (DC), alternating current (AC), or both. The power conditioning module 18 may include a mechanism to convert DC to AC, such as an inverter. The fuel cell system 10 may include any number of power modules, such as 2-30 power modules 500. For example, the fuel cell system 10 shown in FIG. 5 includes six power modules 500 (arranged side by side in a row), one fuel processing module 16, and one power conditioning module 18. The power modules 500, fuel processing module 16, and power conditioning module 18 may be disposed on a common base 20. Base 20 may also provide a common space for wiring cables, power lines, conduits that may connect the power modules 500 with the fuel processing module 16 and/or the power conditioning module 18. Each of the power modules 500, fuel processing module 16, and power conditioning module 18 may include its own cabinet. Alternatively or additionally, as will be described in more detail below, the fuel processing module 16 and the power conditioning module 18 may be combined into a single input/output module 14 disposed in one cabinet.

Each of the power modules 500 include the power module cabinet 22, which may be separated into the electrical cabinet 24 and the fuel cell cabinet 26 as described with reference to FIG. 5. The fuel cell cabinet 26 may be configured to house at least one hot box 13. Each hot box 13 may contain one or more stacks or columns of fuel cells (not shown for clarity), such as, for example, one or more stacks or columns of solid oxide fuel cells having a ceramic oxide electrolyte separated by conductive interconnect plates. Other fuel cell types, such as Proton Exchange Membrane (PEM), molten carbonate, phosphoric acid, etc., may also be included in the hot box 13. The fuel cell stacks may include externally and/or internally manifolded stacks. For example, the fuel cell stacks may be internally manifolded for fuel and air with fuel and air risers extending through openings in the fuel cell layers and/or in the interconnect plates between the fuel cells.

Alternatively or additionally, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, issued on May 11, 2010, the content of which is expressly incorporated herein by reference in its entirety. The fuel cells may have different fuel/air flow configurations. For example, each fuel cell may have a cross flow configuration (where air and fuel flow roughly perpendicularly to each other on opposite sides of the electrolyte in each fuel cell), a counter flow parallel configuration (where air and fuel flow roughly in parallel to each other but in opposite directions on opposite sides of the electrolyte in each fuel cell), and/or a co-flow parallel configuration (where air and fuel flow roughly in parallel to each other in the same direction on opposite sides of the electrolyte in each fuel cell).

The fuel processing module 16 may include a cabinet which contains components used for pre-processing a fuel, such as, for example, adsorption beds (e.g., de-sulfurizer and/or other impurity adsorption beds). The fuel processing module 16 may be configured to process different types of fuels. For example, the fuel processing module 16 may include at least one of a diesel fuel processing module, a natural gas fuel processing module, or an ethanol fuel processing module in the same cabinet or in separate cabinets. A different bed composition tailored for a particular fuel may be provided in each fuel processing module 16. The fuel processing module 16 may process at least one of the following fuels: natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syngas, bio-gas, bio-diesel and other suitable hydrocarbon or hydrogen containing fuels. In some examples, a reformer 17 may be included in the fuel processing module 16. In some examples, the reformer 17 may be thermally integrated with the fuel cell stack(s). In such examples, a separate reformer 17 may be disposed in each hot box 13 in a respective power module 500. In some examples, if internally reforming fuel cells are used, an external reformer 17 may be omitted. The fuel processing module 16 may be fluidly connected with the one or more of the power modules 500, e.g., via conduits provided in the base 20, to provide processed fuel (e.g., de-sulfurized fuel) to the one or more power modules 500.

The power conditioning module 18 may include a cabinet that contains components for converting DC power generated by a fuel cell stack including in the power module 500 to AC power (e.g., DC/DC and DC/AC converters described in U.S. Pat. No. 7,705,490, issued Apr. 27, 2010, the content of which is expressly incorporated herein by reference in its entirety), electrical connectors for AC power output to a power grid, circuits for managing electrical transients, a system controller (e.g., a computer or dedicated control logic device or circuit), and optionally a cabinet fan connected to the auxiliary bus. The power conditioning module 18 may be configured to convert DC power from the fuel cell modules to different AC voltages and frequencies. Designs for 208V, 60 Hz; 480V, 60 Hz; 415V, 50 Hz and other common voltages and frequencies may be provided. The power conditioning module 18 may be electrically connected with the one or more power modules 500, e.g., via wires provided in the base 20, to provide power to the power modules 500 and receive power generated by the power modules 500. Air filters 32 may be located behind or in doors 30 that lead to each modules. Slits in the doors 30 may serve as air inlets to the air filters 32.

Referring to FIG. 6, in some examples, the fuel processing module 16 and the power conditioning module 18 may be housed in one single input/output module 14 with a common cabinet. When a single input/output module 14 is provided, the fuel processing module 16 and the power conditioning module 18 may be disposed vertically (e.g., power conditioning module 18 may be stacked above or below the fuel processing module 16 de-sulfurizer canisters/beds) or side by side with one another within the single input/output module 14.

As shown in FIG. 6, one input/output module 14 may be provided for one row of six power modules 500, which are arranged linearly side by side on one side of the input/output module 14. The row of power modules 500 may be positioned, for example, adjacent to a building for which the fuel cell system 10 provides power. While one row of power modules 500 is shown in FIG. 6, the fuel cell system 10 may include more than one row of power modules 500. For example, the fuel cell system 10 may include two or more rows of power modules 500 stacked back to back, end to end, side by side, or stacked one onto the other.

The fuel cell system 10 is readily scalable. For example, any suitable number of power modules 500 may be provided in the fuel cell system 10 based on the power needs of the building or other facility serviced by the fuel cell system 10. The power modules 500 and the input/output module 14 may also be provided in other ratios. For example, in some examples, more than six or less than six power modules 500 may be provided adjacent to one input/output module 14. Further, the fuel cell system 10 may include more than one input/output module 14 (e.g., two input/output modules 14 each containing a separate fuel processing module 16 and a separate power conditioning module 18). Although in the example shown in FIG. 6, the input/output module 14 is disposed at the end of the row of power modules 500, the input/output module 14 may also be disposed at other locations of the fuel cell system 10, such as, for example, in the center of the row of power modules 500. Depending on the customer's specification (e.g., demand of power), one or more power modules 500 may be added to the fuel cell system 10, or one or more power modules 500 may be shut down or removed from the fuel cell system 10.

The fuel cell system 10 may be configured in a way to ease servicing of the system. The routinely serviced components (such as the consumable components) may be placed in a single module to reduce the amount of time for service. For example, a purge gas and de-sulfurizer material for a natural gas fueled system may be placed in a single module (e.g., the fuel processing module 16 or the combined input/output module 14). A service person may only need access a single module or cabinet to service the components during routine maintenance. Thus, each of the power modules 500, input/output module 14, fuel processing module 16, and power conditioning module 18 may be serviced, repaired, or removed from the fuel cell system 10 without opening the other modules or cabinets and without servicing, repairing, or removing the other modules or cabinets.

For example, as described above, the fuel cell system 10 may include multiple power modules 500. In some examples, when at least one power module 500 is taken off line (e.g., no power is generated by the stacks in the hot box 13 included in the power module 500), the remaining power modules 500, the fuel processing module 16, and the power conditioning module 18 (or the combined input/output cabinet 14) may not be affected, and may continue to operate to generate power. Furthermore, the fuel cell system 10 may contain more than one of each type of module 500, 14, 16, or 18. In some examples, when at least one module of a particular type is taken off line, the remaining modules of the same type may not be affected, and may continue to operate.

In some examples, in a fuel cell system 10 including a plurality of modules or cabinets, each of the modules 500, 14, 16, or 18 may be electrically disconnected individually, removed individually from the fuel cell system 10, and/or serviced or repaired individually without affecting the operation of the other modules in the fuel cell system 10, allowing the fuel cell system 10 to continue to generate electricity. The entire fuel cell system 10 may not have to be shut down if one stack of fuel cells in one hot box 13 malfunctions or is taken off line for servicing.

The construction and arrangements of the air-cooled electronics module, the fuel cell module cabinet, the fuel cell system module, and the fuel cell system, as shown in the various examples, are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes, and omissions may also be made in the design, operating conditions and arrangement of the various examples without departing from the scope of the present disclosure. Any one or more features of any example may be used in any combination with any one or more other features of one or more other examples. It is intended that the specification and examples be considered as exemplary only, with a true scope being indicated by the following claims and their equivalents.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present aspects.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the present aspects. Various modifications to these aspects will be readily apparent to those skilled in the art, and the generic principles defined herein may be applied to some aspects without departing from the spirit or scope of the written description. Thus, the present disclosure is not intended to be limited to the aspects shown herein but is to be accorded the widest scope consistent with the following claims and the principles and novel features disclosed herein.

What is claimed is:

1. A method of operating a fuel cell system comprising a plurality of fuel cells and a plurality of auxiliary components located in at least one cabinet, comprising:
    monitoring, by a control unit, a parameter of the fuel cell system;
    determining whether the parameter has violated a threshold;
    in response to determining that the parameter has violated the threshold, varying an auxiliary bus voltage by a first amount, a common auxiliary bus connected to each of the auxiliary components such that each of the auxiliary components experiences the variation in auxiliary bus voltage, the auxiliary components including a fan and at least one of an electronic circuit, a glow plug, a blower, a thawing heater, a pump or a valve;
    determining whether the auxiliary bus voltage has reached a voltage limit, the voltage limit preventing overloading of one of the auxiliary components; and
    varying the auxiliary bus voltage to the plurality of auxiliary components by a second amount in response to determining that the auxiliary bus voltage has not reached the voltage limit.

2. The method of claim 1, the method further comprising:
    determining whether the parameter still violates the threshold in response to varying the auxiliary bus voltage by the first amount and the second amount; and
    scheduling a maintenance visit for the fuel cell system in response to determining the parameter still violates the threshold in response to varying the auxiliary bus voltage by the first amount and the second amount.

3. The method of claim 1, the method further comprising:
    initiating an alarm for immediate maintenance in response to determining that the auxiliary bus voltage has reached the voltage limit.

4. The method of claim 1, wherein the parameter is a temperature in the at least one cabinet.

5. The method of claim 1, wherein the parameter is an air flow to a first auxiliary component of the plurality of auxiliary components.

6. The method of claim 1, wherein:
varying the auxiliary bus voltage to the plurality of auxiliary components comprises varying the auxiliary bus voltage to the fan.

7. The method of claim 1, wherein varying the auxiliary bus voltage comprises increasing the auxiliary bus voltage.

8. The method of claim 1, wherein varying the auxiliary bus voltage comprises decreasing the auxiliary bus voltage.

9. The method of claim 1, wherein varying the auxiliary bus voltage comprises instructing an input/output module or a converter in the fuel cell system to vary the auxiliary bus voltage provided to the plurality of auxiliary components.

10. The method of claim 1, wherein:
the monitored parameter comprises measured temperature in the at least one cabinet;
when the measured temperature violates the threshold it indicates that an air inlet filter in the at least one cabinet is clogged; and
varying the auxiliary bus voltage provided to the plurality of auxiliary components by a first amount comprises increasing the auxiliary bus voltage to increase speed of a cabinet fan.

11. The method of claim 10, wherein the control unit monitors the temperature using a temperature sensor located in the at least one cabinet.

12. The method of claim 11, wherein the at least one cabinet containing the temperature sensor and the fan comprises a power module cabinet which further contains a hot box containing the plurality of fuel cells.

13. The method of claim 11, wherein the at least one cabinet containing the temperature sensor and the fan comprises an input/output module cabinet which further contains a DC/AC converter electrically connected to the plurality of fuel cells.

14. The method of claim 10, wherein the control unit monitors the temperature using a temperature sensor located in a converter in the fuel cell system.

15. The method of claim 1, wherein:
the monitored parameter comprises fluid pressure, pressure difference or flow rate in a conduit;
when the fluid pressure, pressure difference or flow rate violates the threshold it indicates that a valve in the conduit is stuck or frozen; and
varying the auxiliary bus voltage provided to the plurality of auxiliary components by a first amount comprises increasing the auxiliary bus voltage to the valve to open or close the valve.

16. The method of claim 1, wherein:
the fan is a non-adjustable fan, wherein a speed of the non-adjustable fan is not adjustable via dials or controls; and
varying the auxiliary bus voltage provided to the plurality of auxiliary components by a first amount comprises increasing the auxiliary bus voltage to increase the speed of the non-adjustable fan.

17. A fuel cell system, comprising:
a plurality of auxiliary components connected to a common auxiliary voltage bus, the plurality of auxiliary components including a fan and at least one of an electronic circuit, a glow plug, a blower, a thawing heater, a pump or a valve;
an input/output module configured to provide an auxiliary bus voltage to the plurality of auxiliary components via the common auxiliary voltage bus, wherein the common auxiliary bus is configured to deliver the auxiliary bus voltage from the input/output module to each of the plurality of auxiliary components; and
a control unit configured with processor-executable instructions to:
monitor a parameter of the fuel cell system;
determine whether the parameter has violated a threshold; and
vary the auxiliary bus voltage provided to each of the plurality of auxiliary components by a first amount in response to determining that the parameter has violated the threshold;
determine whether the auxiliary bus voltage has reached a voltage limit, the voltage limit preventing overloading of one of the auxiliary components; and
vary the auxiliary bus voltage to the plurality of auxiliary components by a second amount in response to determining that the auxiliary bus voltage has not reached the voltage limit.

18. The fuel cell system of claim 17, wherein the control unit is further configured with processor-executable instructions to:
determine whether the parameter still violates the threshold in response to varying the auxiliary bus voltage by the first amount;
schedule a maintenance visit for the fuel cell system in response to determining the parameter does not violate the threshold in response to varying the auxiliary bus voltage by the first amount; and
initiate an alarm for immediate maintenance in response to determining that the auxiliary bus voltage has reached the voltage limit.

* * * * *